Jan. 14, 1958     T. G. GREGORY     2,819,9..

POROUS AND FOAMY SPONGELIKE MATERIALS

Filed July 22, 1955

INVENTOR.

2,819,993
POROUS AND FOAMY SPONGELIKE MATERIALS

Thurlow G. Gregory, Cleveland Heights, Ohio

Application July 22, 1955, Serial No. 523,694

3 Claims. (Cl. 154—54)

This invention relates to an improvement in the wearing properties of the soft, elastic, foamy and porous gas-expanded substances of which the commonly known sponge rubbers and plastic rubber-like sponges are examples and the method of embodying this invention within such substances. By plastic sponges I mean soft and elastic porous or foamy masses with body material consisting of a substance with physical properties of the order of soft, elastic rubber. All elastic foam rubbers and the like have the advantageous property of maintaining their elastic, sponge-like nature and their sponge-like flexibility for long periods of time but all have the common disadvantage of breaking apart or separating relatively quickly while in use. This invention relates directly to positioning strengthening means, preferably unelastic, pliable cords within the body of the foamy or porous gas-expanded elastic substances but having these unelastic supporting cords to be pliable in nature and of such length and physical characteristics as to allow elasticity and flexibility of the foamy or porous mass when dry or set but nevertheless inhibiting the breaking apart of the dry body material. All elastic, sponge-like masses are formed by the inclusion of air or other gas within the mass while plastic or liquid whereby to form a froth. As is well known in the art, all substances from which the frothy masses are made are of such character or surface tension when liquid that they have the power to froth. Therefore, when such terms as foamy and frothy and gas-expanded and other terms comparable thereto are employed herein and in the appended claims I mean the state of the substance at the time it is used.

As the consistency of these soft, elastic, foamy and porous gas-expanded substances is so very different from the consistency of the solid soft rubber of automobile tires, the results achieved by this invention are very different from the results achieved by the cords in automobile tires, garden hose and the like. Solid soft rubber will tolerate long, parallel, relatively straight, unelastic cords that are homogeneously spaced from each other as in automobile tires, garden hose and the like; whereas foam rubber and other soft, foamy and porous elastic materials lose a high proportion of their soft, sponge-like elasticity and break apart relatively quickly when long, unelastic cords which extend as continuous cords from side to side or from end to end are present within the mass.

Figure 1:
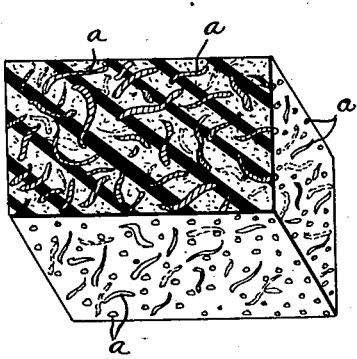
Figure 2:
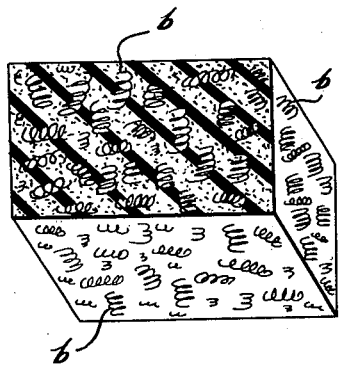
Figure 3:
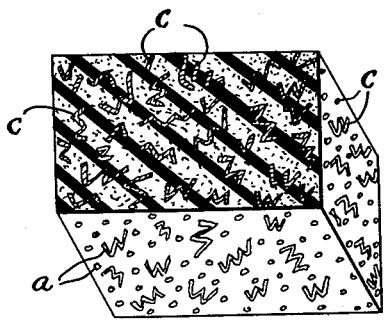
Figure 4:
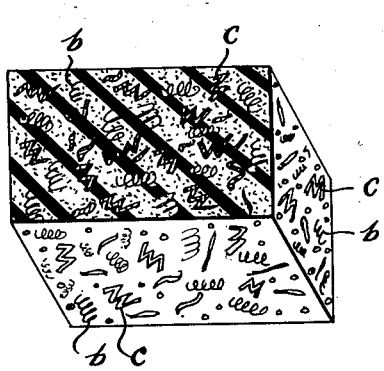

Figures 1–4 inclusive show various forms of the invention both in perspective and in cross-section.

I have discovered that by the means of this invention three-fold advantages become possible. First, the strengthening action of unelastic cords made from cotton, rayon, nylon, flax and the like in foam rubbers and the like can be achieved and, second, the disadvantage of cutting through these gas-expanded masses is avoided and, third, substantially full elasticity of such masses is preserved. When the words cotton cords are employed herein and in the appended claims they are intended to embrace all of the entire group of cords of organic fibers.

In this invention I provide unelastic cords that are quite short in length and most of the cords are preferably not straight but designedly crooked or curled and I position these preferably crooked or curled, unelastic, pliable, short cords at random within the mass and allow the foamy or porous mass to set while in the gas-expanded state upon and around the short, preferably crooked or curled pliable cords.

When these cords are of the short lengths as herein described, these short cords being position at random, they are at various distances apart within the dry or set, elastic, foamy or porous mass and each respective cord being short, free and unattached to other cords the entire short cord as well as each and every part thereof is capable of motion in every direction while within the gas-expanded mass including all up and down and all side to side and all end to end motions and conform to every movement of the dried or set foamy or porous mass.

Furthermore, when these short, unelastic, pliable cords are crooked or curled as herein described as being preferred, the pliable crooked cords tend to straighten temporarily when the set foamy or porous mass is stretched, compressed or flexed or otherwise changed in physical form and these crooked or curled cords tend to come back to their crooked or curled state when the disturbed foamy or porous mass resumes its customary physical shape. These cords being crooked or curled they more readily conform to the physical changes in shape of the masses while in use and more readily go and come with every changing position of the foamy or porous masses. They also greatly strengthen these masses. These random unelastic flexible cords preferably should be of lengths of from approximately one-half inch to approximately four inches in length from end to end when extended in a straight line for measuring. The preferred lengths of the units of crooked or curled cord while in the crooked or curled state are from approximately five-sixteenths of an inch to one and one-fourth inches in length when in the crooked or curled state by which I mean the lengths of the units when the cords from which the units are formed are not extended in a straight line. However, if the cords are very crooked or greatly curled, they may be longer. Various lengths of either straight or crooked cords desirably may be in one mass of the dry or set gas-expanded material. They may be of random sizes as well as of random lengths and random positions and shapes. By crooked I mean not straight, and while the crooks may be in the form of random crooked cords or means as at $a$ in Fig. 1 or irregular spirals or curls as shown at $b$ in Fig. 2 or irregular zig zag as shown at $a$ and $c$ in Fig. 3, it is preferred that they be random in shapes, lengths, sizes and positions as shown at $a$ in Fig. 1 and at $b$ and $c$ in Fig. 4.

By pliable cords I mean unelastic cords which are easily bent but which do not appreciably stretch but tend to retain their normal length and as somewhat possessing the properties of nylon cords or cotton cords or rayon cords which are easily bent but are not appreciably elastic by which I mean that they are not easily stretched appreciably as distinguished from soft, elastic rubber.

The term pliable, unelasatic cords when used herein and in the appended claims embraces any unelastic, pliable strengthening elements or means which simple experimentation will show to be equivalent to such cords for the purposes of this invention. When the words cords formed from fibers of organic matter and other expressions comparable thereto are employed herein and in the appended claims I mean soft and pliable cords formed from fibers of cotton, rayon, nylon or flax or other obvious soft and pliable fibers of organic equivalents as distinguished from cords formed from strands of metallic wire, asbestos, glass fibers and other comparable inorganic matter.

It is especially pointed out that the unelastic, pliable cords or strengthening means are preferably not all on the same plane horizontally or perpendicularly but are present at random within each respective mass. The preferred sizes of the cords or strengthening means are from approximately one one-hundredth of an inch to approximately one-sixteenth of an inch in diameter.

Most of these foamy or porous substances which are soft and elastic or spongy at normal room temperatures are, when in the plastic state at the time of frothing, by which I mean the liquid or tending to the liquid state due to the application of heat or due to the presence of a solvent, are of such character that before setting they will adhere to the unelastic cords or strengthening means and during the advent of setting they will bond as a froth or porous mass onto the unelastic cords or unelastic supporting means described in this invention.

It is sometimes preferred but not essential that prior to the inclusion of the short strengthening cords within the mix that the short crooked or curled cords be impregnated with or coated with a water-repellant or solvent-proof substance, by which I mean a substance that will inhibit the entry of appreciable water or other solvent of fabrication into the crooked or curled cords and thereby tend to straighten them out during fabrication of the mass.

The short, pliable, unelastic cords are mixed more readily in a random manner into the elastic or spongy gas-expanded mass by first mixing the short pliable cords into a minor amount of the foamy plastic mass before the foamy mass sets and then mixing this smaller amount of non-set plastic mass plus the pliable cords therein into the larger amount of non-set frothy matter and thereafter allow the total mass to set. This prevents to a substantial degree the matting of the short, pliable cords. The ratio of short pliable cords to the frothy mass is not critical but will vary depending upon the needs for the use to which each lot of the final gas-expanded mass is to be put when set. When terms such as foam rubber, foamy and porous gas-expanded masses, elastic gas-expanded substances and the like are employed herein and in the appended claims I mean those masses in which the rubber or like substance constitutes a sufficiently large proportion of the total bulk of the mass to impart its rubber-like properties and characteristics to the mass. I mean by this to distinguish these rubber or rubber-like masses from that other broad group of porous masses in which a binder is employed to bond together a bulk lot of light weight fibrous material after the order of the more or less commonly termed cellulose sponges in which jute or some other fibrous material is bonded by cellulose xanthate or latex or some other binder into artificial fibrous masses which are very similar to the fibrous sponges of nature.

By such terms as fully suspended, fully internally, free and floating as applied to cords I mean that in the main neither one end nor both ends of the respective cords extends to or through a surface of the mass. These terms where employed herein and in the appended claims are intended to distinguish the body material and the cords of this invention from the body material and the cords of masses in which the cords may in the main extend all the way from end to end of a gas-expanded rubber or like mass or may in the main extend all the way from side to side of a gas-expanded rubber or like mass.

By porous I mean that a substantial part of the bubble-formed openings extend from the surface deeply within the body of the mass when the said mass is set and dry whereas by foamy I means that most of the bubble formations are bubbles fully entrapped within the mass when the mass is dry and set. By dry I mean that enough of the water or solvent has evaporated or dispersed whereby to permit the mass to set and thereafter to permit the normal or customary use of the gas-exapnded mass. When the words "gas-expanded mass" and the like are employed herein and in the appended claims they are intended to include foamy masses and also porous masses as well as masses that are both foamy and porous.

The subject matter of this application is distinguished from that of my co-pending application filed concurrently herewith July 22, 1955, and bearing Serial Number 523,695, in that the strengthening elements in this present application are unelastic whereas those in the co-pending application are elastic.

Having described my invention, I claim:

1. A cord re-enforced sponge rubber article, comprising a mass of sponge rubber having independent, disconnected, short lengths of cord of fibrous organic material dispersed in random relationship throughout the entire body of said mass, said cords being within the range of one-fourth of one inch and four inches in length when straightened full length and between approximately one one-hundredth of one inch and approximately one-sixteenth of one inch in diameter, whereby said short lengths of cords tend to move relative to one another while embedded in said mass, when it is stretched in any direction and resist tearing of said article.

2. The sponge rubber article of claim 1 in which the cords are of cotton.

3. The sponge rubber article of claim 2 in which the cords are curled.

References Cited in the file of this patent
UNITED STATES PATENTS

| | | |
|---|---|---|
| 1,427,754 | Gibbons et al. | Aug. 22, 1922 |
| 1,884,106 | Moran | Oct. 25, 1932 |
| 2,140,063 | Talalay | Dec. 13, 1938 |
| 2,150,178 | Maywald et al. | Mar. 14, 1939 |
| 2,159,213 | Howard | May 23, 1939 |
| 2,273,313 | Clapp | Feb. 17, 1942 |
| 2,280,022 | Banigan et al. | Apr. 14, 1942 |
| 2,298,986 | Taylor et al. | Oct. 13, 1942 |
| 2,409,660 | Briggs | Oct. 22, 1946 |
| 2,568,866 | Osterhof et al. | Sept. 25, 1951 |
| 2,719,795 | Nottebohm | Oct. 4, 1955 |

FOREIGN PATENTS

| | | |
|---|---|---|
| 381,975 | Great Britain | Oct. 20, 1932 |
| 804,987 | France | Aug. 17, 1936 |

OTHER REFERENCES

"Glass Fiber Reinforcement of Foam Rubber," by Bailey Bennett et al., published in India Rubber World, September 1950, pages 672, 673 and 710.